INVENTOR
BERNARD C. MATHEWS
BY
ATT'YS.

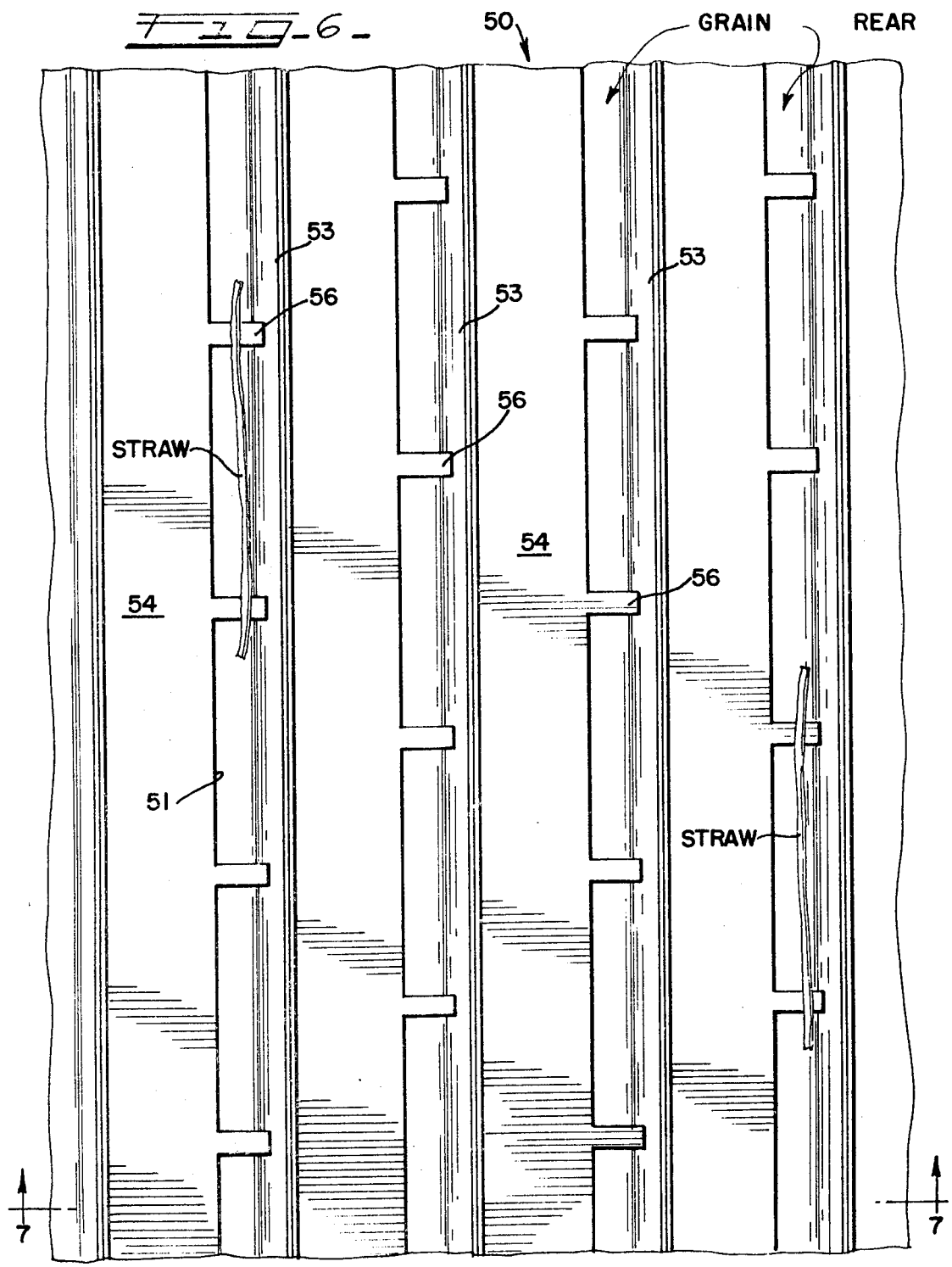

United States Patent Office

3,606,026
Patented Sept. 20, 1971

3,606,026
SIEVE MECHANISM FOR SEPARATING GRAIN
Bernard C. Mathews, Box 70, Crystal Lake, Ill. 60014
Filed Apr. 22, 1969, Ser. No. 818,295
Int. Cl. B07b 1/28
U.S. Cl. 209—318                                   7 Claims

ABSTRACT OF THE DISCLOSURE

The separating mechanism comprises an upper sieve and a lower sieve located one above the other and supported by cranks journaled in the side walls of the casing of a combine. The cranks for the upper and lower sieves are offset from each other 180°. The cranks are driven at about 200 r.p.m. Both of the sieves have transverse ribs about ½ inch high and 2 inches apart. Threshing mix deposited on the upper sieve will be agitated by the circular vibratory motion which shakes the grains or kernels out of the mix and through the sieves. An axial delivery fan located in front of the two sieves causes an air blast to blow upwardly through the upper sieve. Flexible seals are provided at the front and rear ends of the upper sieve to confine the air blast. A shutter in the form of sliding plates regulates the air blast. The casing has a movable bottom which is hingedly mounted at its rear end at the lower sieve and slidingly engages a portion of the casing at its front end. Preferably, the openings in the upper sieve are in the form of transverse slots having shelves underneath and slots to block endwise movement of straw.

---

The present invention relates to a new and improved sieve mechanism for separating grain.

In combines now used, grain is separated from the straw, chaff and other particles of the threshing mix by a combination of screening and air blast action, and the screen is vibrated back and forth to walk the larger particles off of the rear edge of the screen from which they drop to the ground.

At present the usual grain sieve is either a perforated metal screen or a combination of overlapping metal strips arranged like a shutter which can be adjusted by varying the opening dimensions through which the grain may drop and to regulate the counterflow of air. The shutter type gives a better walking action.

However, the shutter construction is not entirely satisfactory for the reason that pieces of straw can and do drop through the shutters either endwise or sidewise, and in practice it is also found that the grain bin of the combine contains numerous smaller particles of a dimension smaller than the shutter opening dimensions. In other words, the grain is not particularly clean, from which it can be inferred that the shutter type construction is not particularly effective with respect to small particles.

Furthermore, in either the screen type or the shutter type there is a certain amount of grain loss over the end of the sieve, and this end loss of the grain may be particularly severe when the straw is matted.

It is an object of my invention to provide an improved cooperation of agitation and air blast action which both produces cleaner grain and reduces end loss of the grain.

The present invention is an improvement over the mechanism of my prior copending application, Ser. No. 741,588 filed July 1, 1968, now abandoned, and is suitable for use not only in combines, but also in stationary installations for cleaning grain.

According to my invention, there are two sieves, one above the other, and I provide transverse ribs on at least the upper sieve and vibrate both sieves with a circular vibratory motion, referred to herein as an "orbiting" motion.

The ribs impart the rearward or walking component to the threshing mix and also serve as a spacer to maintain larger particles and matted straw spaced above the bottom of the channels between the transverse ribs.

The circular vibratory or orbiting motion provides a much better agitation of the threshing mix than that which is obtained by substantially linear vibratory motion. More specifically, the orbiting motion, which is about 200 revolutions per minute, causes the ribs to rapidly strike the larger particles and matted straw several times per second, thus causing the kernels to be shaken out of the straw. Also, in the event that the threshing mix is less consolidated so that it tends to fill up the channels rather than riding on top of the ribs, the orbiting motion imparts a tossing motion to the threshing mix in which the particles tend to be tossed rearwardly from one channel to the next. However, the air blast provides a certain sifting in which the less dense particles are lifted far away from the sieve whereas the more dense particles, such as the kernels, are not as much affected by the air blast with the result that they remain closer to the bottom wall of the channel, and thus have a much greater tendency to drop through the openings than is the case with the lighter particles.

In either situation, that is, in the case of matted straw, or in the case of a loose mix, the air required to assist in the separating process is more efficiently employed, due to the greater agitation and to the tossing action. As a result, there is much less tendency for the kernels to be affected by an unduly strong air blast. In the linear vibratory sieves now in commercial use, a much greater volume of air is required to compensate for the lesser degree of agitation, with the result that there is a greater tendency of the kernels to move with the threshing mix, especially when matted conditions are encountered, with the result that a substantial portion of the kernels are walked to the rear of the sieve and dropped off onto the ground.

In spite of the fact that a lesser amount of air is required in my arrangement, about 95% of the chaff is removed at the first sieve.

My arrangement makes it possible to handle much thicker beds of threshing mix than in the case of the linear vibrating sieve without encountering loss of grain over the rear end. Thus, that which drops through the first sieve is largely grain with a relatively small proportion of particles. Since this represents less than $\frac{1}{10}$ of the volume of the original threshing mix, the bed on the second sieve will be comparatively thin with the result that the efficiency of the separating action is correspondingly increased. More specifically, I find that practically all of the remaining particles are separated from the kernels on the second sieve with the result that the grain in the bin of the combine is very much cleaner than that which is found in the bins of present day commercial combines having linear sieve vibration.

An important feature of my invention is that means are provided to regulate the air blast so as to obtain optimum separation. It often happens that in a field one portion will be much drier than another portion, and hence there is greater tendency for grain loss in the drier mix. According to my invention, the force of the air blast can be cut down by simple adjusting means which are operable while the combine is in motion. The air supply should be sufficient to result in grain which is 100% clean, but less than that which will cause kernels to be discharged over the rear end of the sieve. According to my invention there is considerable difference between the minimum air required and the maximum air which is permissible; in other words, there is always a considerable range between the two on a given crop, where such is not the case with present day commercial devices.

As a result, the separating mechanism disclosed, except for the substitution of sieves, is suitable for various grains, including corn.

In the drawings:

FIG. 3 is a fragmentary elevation of the shutter device, taken along the line 3—3 of FIG. 1;

FIG. 4 is a fragmentary elevation of the lower sieve;

FIG. 5 is a vertical section taken along the line 5—5 of FIG. 4;

FIG. 6 is a fragmentary plan view of the upper sieve;

Figure 1:
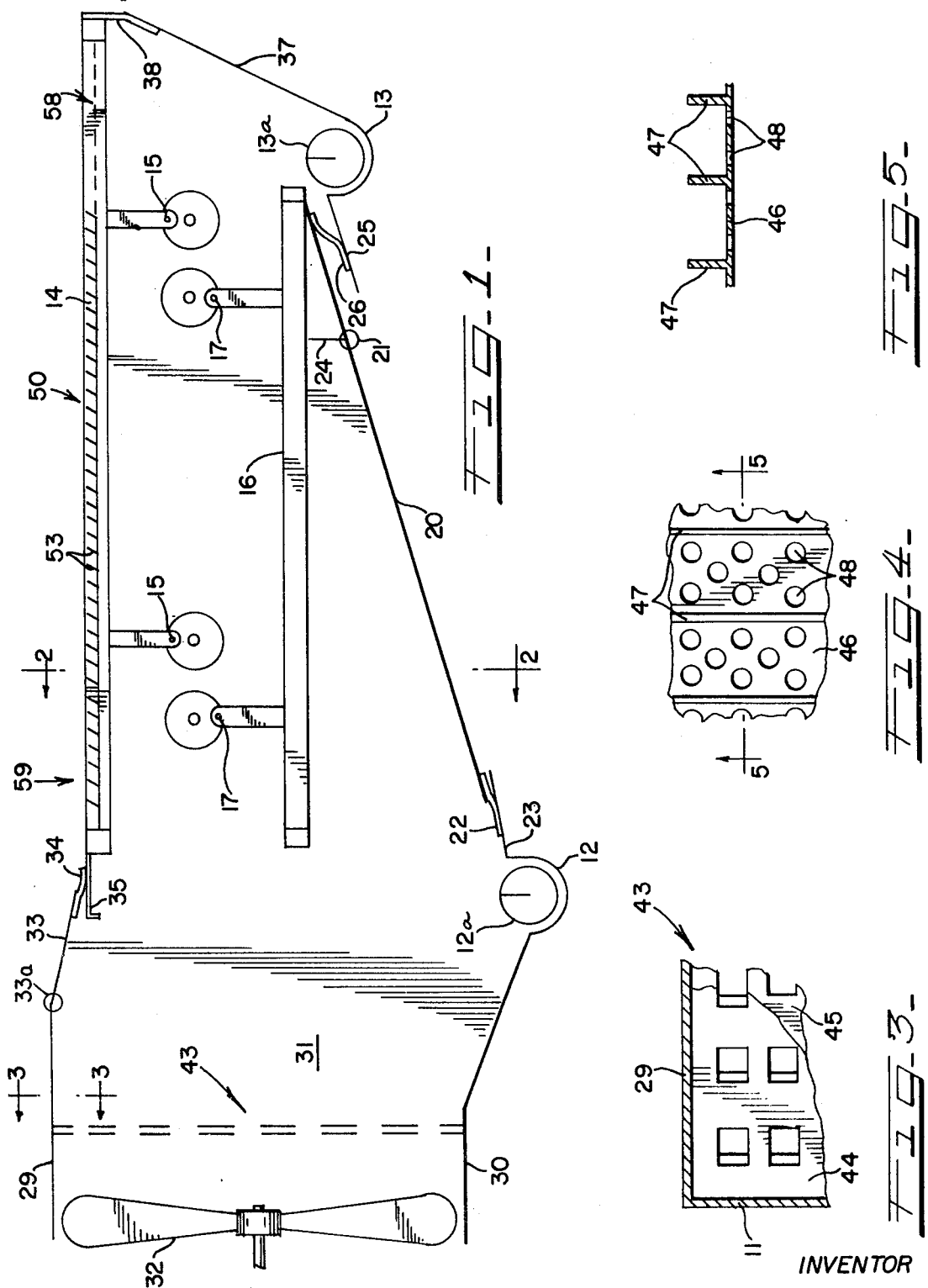
FIG. 1 is a diagrammatic elevation of a preferred embodiment of my invention as applied to a combine.
Figure 2:
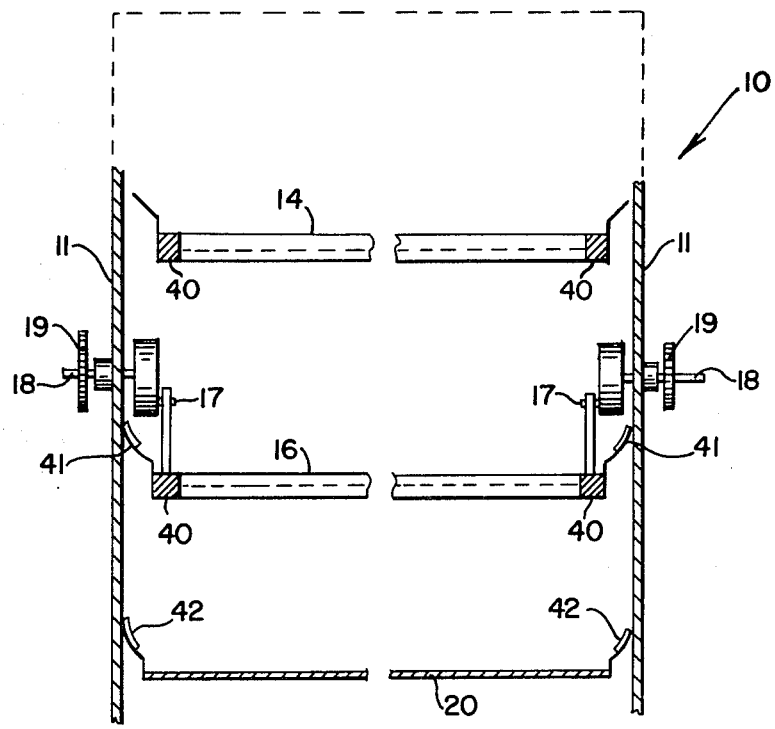
FIG. 2 is a fragmentary transverse section taken along the line 2—2 of FIG. 1.

FIGS. 1 and 2 show an upper sieve 14 and a lower sieve 16 which are horizontally disposed within a casing 10 (FIG. 2), which is of conventional construction, having side walls 11. FIG. 1 shows a front auger trough 12 and a rear auger trough 13 which extend transversely of the lower part of the casing.

The upper sieve 14 is supported by four cranks 15, two on each side. The lower sieve 16 is supported by four cranks 17. Each of the cranks 15 and 17 are mounted on a stub shaft 18 journaled, by suitable bearings, in the side walls 11 as shown in FIG. 2. Sprockets 19 are mounted at the outer ends of the stub shafts 18, and all are of uniform diameter so that they may be driven at a uniform speed and in the same direction by a single sprocket chain, not shown, for each side.

The casing has a movable bottom wall 20 which is supported at its rear end from the lower sieve 16 by a hinge 21. The front end of the bottom wall terminates in a rubber wear plate 22 which bears on a lip 23 of the front auger trough 12. Thus as the rear end of the bottom wall 20 moves in a circular path, the wear plate 22 will slide back and forth on the lip 23.

Underneath the rear end of the lower sieve 16 there is a short tray 24 the front end of which carries the hinge 21. Underneath the tray 24 is a lip portion 25 of the rear auger trough. A seal 26 is provided between the tray 24 and the lip 25 by means of a resilient strip of metal or relatively stiff rubber which is secured to the underside of the tray 24 and bears against the lip 25.

At the front end of the casing 10 there are two horizontal walls 29 and 30 which cooperate with the side walls 11 to define a plenum 31. One or more axial delivery fans 32 are mounted side by side in front of the plenum and driven by suitable belts or chains, not shown. The space between the front edge of the upper wall 29 and the upper sieve 14 is sealed by a hinged flap 33 having a rubber wear plate 34 which bears against a lip 35 extending forwardly from the upper sieve 14. The flap 33 is connected to upper wall 29 by a hinge 33a.

The casing 10 includes a lower rear wall 37 which extends upwardly and rearwardly from the rear auger trough 13. A hinged strip of metal or a flexible strip of relatively stiff rubber 38 extends downwardly from the rear edge of the upper sieve 14 and bears against the front upper surface of the rear wall 37. Thus the hinged flap 33 and the flexible strip 38 provides flexible seals which prevent the escape of air so that substantially all of the air in the plenum 31 will pass upwardly through the upper sieve 14, some of it also passing through the lower sieve 16.

As shown in FIG. 2, flexible seals 41 mounted on the side rails 40 of the lower sieve 16 engage the side walls 11 to prevent loss of grain at this point. A similar seal 42 is provided for the bottom wall 20, but is not necessary for the upper sieve 14 if the clearance is small.

Means are provided for regulating the volume and force of the air blast, which means can be a variable speed drive for the fans 32, or a shutter device 43, as shown. A more or less diffuse air stream is desired which will extend throughout the whole cross section of the plenum 31. This assures that a substantial portion of the air current will move directly into the space between the sieves 14 and 16 to drive away the chaff and any particles which fall through the upper sieve due to the fact that they are entrapped by the grain. As a result, by the time that the grain drops onto the lower sieve 16, it is quite clean. A portion of the air current goes into the space between the lower sieve 16 and the bottom wall 20, and thence upwardly through the lower sieve 16.

A diffuse air stream is not obtained by the usual centrifugal type blower; the air is concentrated at either end of the plenum, but there is very little or no air delivery at a point half way between the ends. That is why axial delivery fans are preferred, and two or more are preferably provided so they may be spaced uniformly across the width of the machine.

The shutter comprises two superimposed barriers 44 and 45, respectively, shown in FIG. 3, each of which is provided with a number of overlapping square openings. The barriers are shiftable with respect to each other so that the size of the opening may be regulated. This construction avoids the deflection of the air blast which accompanies conventional pivoted shutters, and at the same time maintains the diffuseness of the air stream.

The construction of the lower sieve 16 is shown in FIGS. 4 and 5 in which a sheet 46 of perforated metal has a number of ribs 47 spaced about two inches apart, and from one-quarter to half an inch high. The dimensions of the perforations 48 vary with the type of grain, as follows:

Wheat: ⅜″ round
Barley: ⅜″ round
Rice: ⅜″ round
Alfalfa seed: ³⁄₃₂″ round
Corn: ⁷⁄₁₆″ x 1″ elongate
Beans: ½″ round The upper sieve 14 is made in two sections; a front section 50 of from four to five feet long from front to back, and a rear section 58 which is 15 inches long and does not have the transverse ribs, except in the case of corn.

Figure 7:
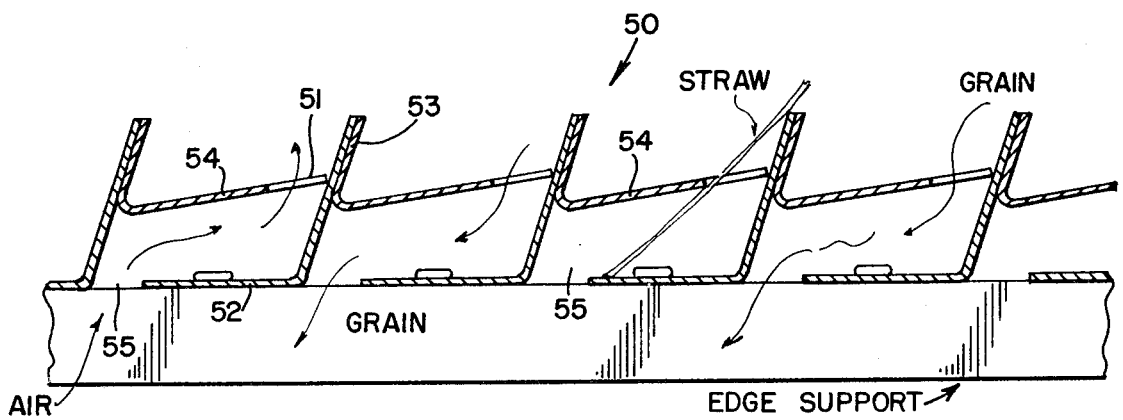
FIG. 7 is a vertical section taken along the line 7—7 of FIG. 6.
Figure 8:
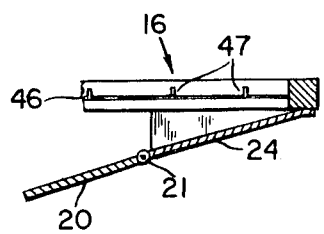
FIG. 8 is a detailed vertical longitudinal section through the rear end of the lower sieve.

The front section 50 is shown in FIGS. 6 and 7 in which the opening is in the form of a transverse slot 51 about ½″ wide. A shelf 52 underlies the slot 51. The ribs 53 are inclined rearwardly, and extend from ½″ to ⅝″ above the channel bottom 54, which may be horizontal as in FIG. 5, or inclined upwardly and rearwardly as shown in FIG. 7. The shelf 52 terminates short of the front rib to provide a second opening 55, offset forwardly of the slot 51. The advantage of this arrangement is that due to the offset openings 51, 55, a piece of straw cannot go through the sieve endwise.

Fingers 56 extending rearwardly from the horizontal portion 54 and abutting the front surface of a rib 53 prevent long pieces of straw from entering the slot 51 sidewise. The fingers may be spaced 1″ or 2″ apart.

In the case of corn, the shelf 52 can be omitted. Here, a construction similar to FIGS. 4 and 5 is preferred, except that the openings are elongate, extending from front to back, substantially one inch long and one-half inch wide, with the rib spacing a little more than an inch.

For all types of grain, the ribs 47 or 53 on the upper sieve are an important feature of the invention because they tend to prevent walking of the grain, whereas they do not prevent walking of the particles.

This is because the air blast in combination with the orbiting motion performs a selective action. With a crank radius of one inch (two inch throw), best results are obtained at speeds between 190 and 230 r.p.m., with maximum results at 207 r.p.m. It has been observed that below this speed range, the threshing mix does not walk to the rear; at speeds above this range the grains dance up and down, but do not tend to drop through the perforations except on a random basis. Also at the higher speeds, the mix remains more or less in suspension without that agitation which shakes the grain kernels out of the mix.

Both sieves may be either of the FIG. 4 type or of the slot type of FIG. 6; however, for perfect cleaning, the arrangement described is preferred. In general, the rib height is somewhat less on the lower sieve and the openings or slot widths somewhat larger on the upper sieve.

The crank radius of the lower sieve is preferably somewhat less than that of the upper sieve; for instance, in the embodiment shown the lower sieve crank radius is ¾" (1½" throw) whereas the upper crank radius is 1". That is why the rib height is lower on the lower sieve.

The upper sieve section 58 is preferably a screen with a mesh of ¾" to 1", or a perforated metal sheet with openings of from ¾" to 1".

The openings should be large enough to accommodate grain heads and other insufficiently threshed particles which drop through to the tailings auger 13a for return to the cylinder. Ribs are not necessary, for at this point all non-grain particles have been winnowed out by the air blast. In the case of corn, there will still be pieces of cob, so ½" ribs are preferred to impart the horizontal or walking component.

The threshing mix is deposited on the upper sieve 14 at the front end (arrow 59) by a suitable conveyor, not shown, such as a series of augers as shown in my aforesaid copending application Ser. No. 741,588. The clean grain slides down the bottom wall 20 to the clean grain auger 12a. The operation of the combine before and after separation and cleaning is substantially the same as in said copending application, the disclosure of which is hereby incorporated by reference into this application, insofar as said disclosure is consistent with the teachings of the present invention.

As shown in FIG. 1, even though all of the cranks 15 and 17 are rotated in the same rotative direction, the lower cranks 17 are 180° offset from the upper cranks 15. Thus, the sieves 14 and 16 move in opposite vertical directions at the same time. This provides a counterbalancing action which eliminates the usual vibration of the housing encountered in linear vibratory sieves. Also, it provides a type of bellows action which creates a pulsating air blast through the upper sieve 14 as it descends, thus contributing to the separating action.

I claim:

1. Separating mechanism for grain and the like comprising a first sieve having a front portion for receiving a threshing mix for movement longitudinally of said sieve toward the rear thereof a second sieve located beneath said first sieve, means for imparting circular longitudinal and vertical vibratory motion to both of said sieves, means for establishing an air blast which passes longitudinally upwardly through said two sieves, and an enclosure surrounding said sieves and communicating with said air blast establishing means, said sieves being arranged so that at least a portion of the air blast traversing said first sieve also traverses said second sieve, said first sieve having transverse ribs and bottom portions defining a series of transverse channels, the openings in said first sieve being located only in the rear portions of said channel bottom portions.

2. Grain separating mechanism as claimed in claim 1 which includes flexible seal means connecting the front and rear ends of said first sieve with said enclosure, and said enclosure including a movable bottom wall hingedly supported at one end from said second sieve, and sealing means between the other end of said bottom wall and said enclosure.

3. Separating mechanism as claimed in claim 1 in which said air blast establishing means comprises an axial delivery fan, and means for regulating the volume and force of said air blast.

4. Separating mechanism as claimed in claim 3 in which said regulating means comprises a pair of barriers disposed between said sieves and said fan and each having a plurality of openings which are normally aligned with each other, one of said barriers being shiftable with respect of the other to reduce the effective size of the opening.

5. Separating mechanism is claimed in claim 1 in which said motion imparting means comprises first crank means for said first sieve, and second crank means for said second sieve, said first and second crank means being offset from each other by 180°, and the radius of said second crank means being less than the radius of said first crank means.

6. Separating mechanism as claimed in claim 5 in which the radius of said first crank means is substantially 1 inch.

7. Separating mechanism for grain and the like comprising a sieve having a front portion for receiving a threshing mix for movement longitudinally of said sieve toward the rear thereof, means for imparting circular longitudinal and vertical vibratory motion to said sieve, means providing an air blast which passes longitudinally upwardly through said sieve, said sieve having transverse ribs and bottom potrions defining a series of transverse channels, the openings in said sieve being located only in the rear portions of said channel bottom portions, and a series of shelves disposed beneath said openings, each shelf comprising a horizontal portion which extends forwardly beneath the openings of one of said channel bottom portions and toward the forwardly adjacent shelf but terminating short thereof to provide a second opening offset forwardly from said first mentioned opening to provide a labyrinthine path which permits movement of the grain through said first and second openings but tends to prevent lengthwise passage of a straw therethrough in the vertical direction.

References Cited

UNITED STATES PATENTS

| 299,211   | 5/1884  | Earhart  | 209—326X |
| 1,232,947 | 7/1917  | Malm     | 209—318X |
| 2,217,710 | 10/1940 | Shaler   | 209—28   |
| 2,351,567 | 11/1940 | Welty    | 130—24   |
| 2,422,399 | 6/1947  | Erickson | 209—26X  |
| 2,767,905 | 10/1956 | Creed.   |          |

FRANK W. LUTTER, Primary Examiner

W. CUCHLINSKI, Jr., Assistant Examiner

U.S. Cl. X.R.

209—326